(No Model.) 2 Sheets—Sheet 1.

W. H. MARSHALL.
SLACK ADJUSTER FOR BRAKES.

No. 518,110. Patented Apr. 10, 1894.

Witnesses:
Harry S. Rohrer.
Jas. W. Dyre

Inventor:
Waldo H. Marshall
By F. W. Ritter Jr.
Atty.

(No Model.) 2 Sheets—Sheet 2.
W. H. MARSHALL.
SLACK ADJUSTER FOR BRAKES.

No. 518,110. Patented Apr. 10, 1894.

Witnesses:
Harry D. Rohn
Jas. W. Dyre

Inventor:
Waldo H. Marshall
By F. M. Ritter
Atty.

UNITED STATES PATENT OFFICE.

WALDO H. MARSHALL, OF CHICAGO, ILLINOIS, ASSIGNOR TO THE CONSOLIDATED BRAKE ADJUSTER COMPANY, OF SAME PLACE.

SLACK-ADJUSTER FOR BRAKES.

SPECIFICATION forming part of Letters Patent No. 518,110, dated April 10, 1894.

Application filed July 21, 1893. Serial No. 481,101. (No model.)

*To all whom it may concern:*

Be it known that I, WALDO H. MARSHALL, a citizen of the United States, residing at Chicago, in the county of Cook and State of Illinois, have invented certain new and useful Improvements in Slack-Adjusters for Brakes; and I hereby declare the following to be a full, clear, and exact description of the same, reference being had to the accompanying drawings, in which—

Figure 1:
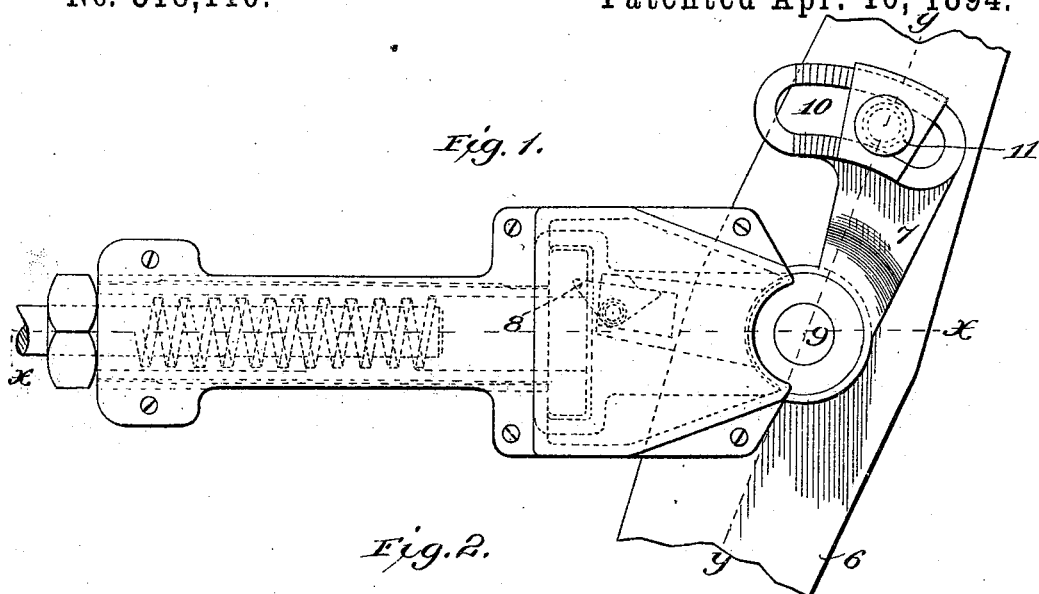
Figure 2:
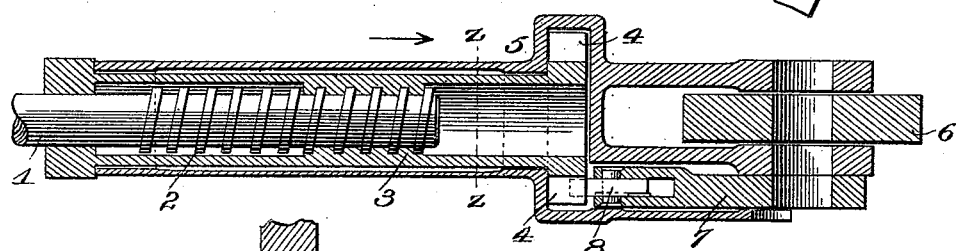
Figure 3:
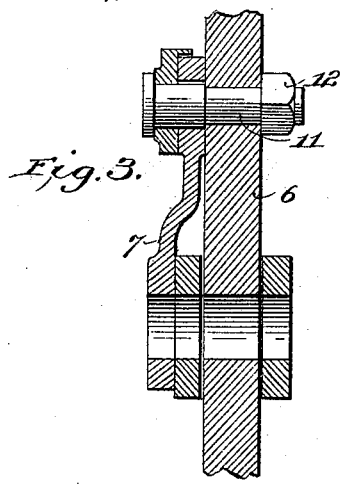
Figure 4:
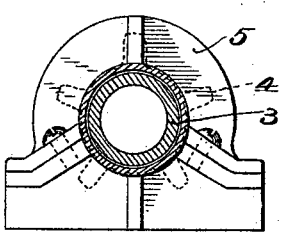
Figure 5:
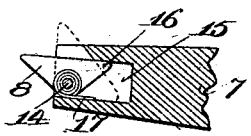
Figure 6:
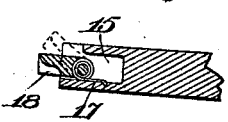
Figure 7:
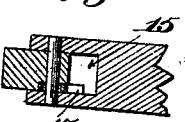
Figure 8:
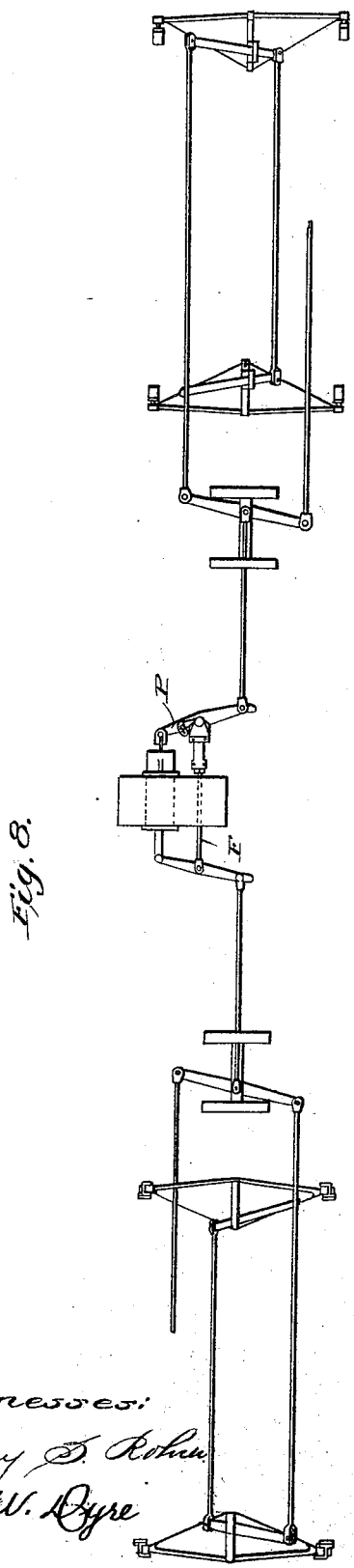
Figure 9:
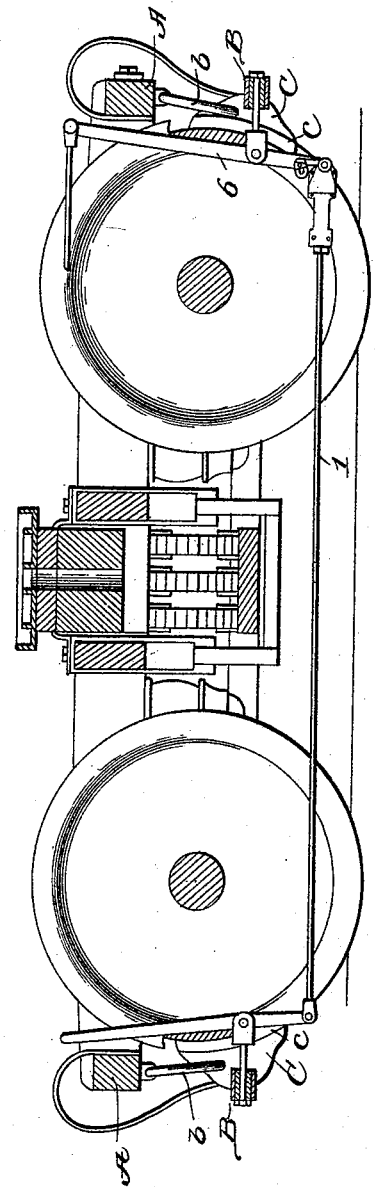

Figure 1 is a side elevation of devices embodying my invention, shown in connection with a portion of the "live lever" of a brake system. Fig. 2 is a partial, longitudinal, horizontal section taken on the line $x—x$, Fig. 1. Fig. 3 is a partial vertical section taken on the line $y—y$ Fig. 1. Fig. 4 is a transverse section taken on the line $z—z$, Fig. 2, looking in the direction of the arrow. Fig. 5 is a vertical section of the end of the bell crank arm or bracket, the latch, pawl, or ratchet, thereof in elevation and on a horizontal axis. Figs. 6 and 7 are similar views of a modification, wherein the latch, pawl, or ratchet is on a vertical axis. Fig. 8 is a view of a brake system for two trucks with intermediate cylinder, showing devices embodying my invention applied to the fulcrum rod between the cylinder levers, and Fig. 9 is a view showing the devices applied to the "live lever" and lower connecting rod of the truck system.

Like symbols refer to like parts wherever they occur.

My invention relates to that class of devices intended to automatically take up the slack in a brake system to compensate for wear of brake shoes, &c., and obviate lost motion.

In fitting brakes to car trucks, it is common to so regulate the lever system and the various connections thereof with the brake beams, &c., that only a given or predetermined movement (which may be termed the "normal movement") is thereafter required to apply the brakes; and such an adjustment of the parts is especially necessary where only a limited motion of the power mechanism—as for instance in air or steam brakes—is permissible. The distance through which the brake shoes must be moved increases gradually, however, by reason of the wear of the face of the shoe, and owing to this and to other causes giving rise to slack in the system, the brake shoes would ultimately have to be moved a greater distance than the effective stroke of the power mechanism, unless the brake system was adjusted from time to time to take up said slack. To overcome these difficulties, some mechanism which will automatically take up this slack and wear in the brake system is required, and such mechanism must be simple, and easily applied, adjusted, and maintained by comparatively unskilled labor. To meet these requirements is the object of the present invention; and to this end my invention—generally stated— embraces the combination with a brake lever or equivalent moving part of the brake system, of a rod or connection leading thereto, a nut or turn-buckle in said connection and having external teeth, a bell crank arm or bracket mounted on the lever or equivalent moving part of the brake system, and a latch pawl or ratchet carried by the bell crank and adapted to engage the teeth of the nut or turn-buckle, whereby the abnormal or excessive movement of the lever or equivalent moving part of the brake system will vary the effective length of the rod or connection so as to compensate for the wear or slack which has given rise to said excessive movement of the lever or equivalent moving part of the brake system.

There are other minor features of invention, all as will hereinafter more fully appear.

I will now proceed to describe my invention more fully, so that others skilled in the art to which it appertains may apply the same.

In the drawings A, indicates the truck-beams or other suitable supports from which the brake beams B are suspended by the usual hangers $b$, said beams being provided with brake heads C and shoes $c$, and having the usual or any approved system of brake levers, connecting rods, and pull-rods.

In Fig. 8, my devices are shown as applied to the fulcrum rod F and the piston lever P, or on the connections between the brake systems of two trucks; while in Fig. 9, the devices are shown as applied to the lower connecting rod and "live" lever of a single truck;—this being done, to show that the movement required to operate the devices may be taken from any moving part of the brake system or particular arrangement of brake levers and connecting rods circumstances may demand. In either case, the connecting rod 1, or equivalent connection may be threaded as at 2, and will carry thereon an internally threaded sleeve or nut 3 provided with peripheral teeth 4, said sleeve or nut 3 having an inclosing case or jacket 5 by means of which it is pivoted on the lever 6, or equivalent moving portion of the system—the whole constituting one, and the preferred form of adjustable or turn-buckle connection within the brake system. Secured to said lever 6 or its equivalent, is a bell crank-arm or bracket 7, one end of which carries a latch 8, adapted to engage the teeth 4 on the periphery of the sleeve or nut 3. This bracket or bell crank lever 7 is preferably pivoted on the center pin 9 by which the jacket 5, nut 3, and connecting rod 1 (or turn-buckle connections) are pivotally connected with lever 6, and the upper arm of the said bell crank lever 7, is provided with an arc shaped slot 10 through which and the lever 6 passes a bolt 11 provided with a nut 12 (or equivalent means is supplied) for regulating the position of the opposite bracket arm which carries the latch or pawl 8 that engages the teeth 4 on the periphery of sleeve or nut 3. The latch or pawl 8 may be on either a horizontal or vertical axis—as preferred. In case it is on a horizon axis, 14, (see Fig. 5) I prefer to slot the end of the bracket or bell crank arm as at 15, and use a pawl or latch 8, of general triangular form—or having a tail piece 16—which limits its movement in one direction supporting said latch by a spring 17 which permits the latch or pawl to yield in the reverse direction. Where a vertical axis or latch is preferred, it may be of the same general character, (see Figs. 6 and 7) but should be provided with an inclined face 18 to facilitate its passing the tooth 4, on the reverse motion of the bracket-arm or bell crank.

The devices being constructed substantially as hereinbefore specified will operate as follows:—The bell crank arm or bracket 7, having been first adjusted by means of the slot 10 and bolt 11 (or equivalent means) to bring the latch arm to such position with relation to teeth 4 on sleeve 3, as is demanded by the angle of the moving part (or lever) to the connecting rod and the amount of the "normal" movement of said lever or moving part of the system,—thereafter, so long as the movement remains "normal"—there being no wear or slack in the system—the latch or pawl 8 will play back and forth between two teeth 4 of nut or turn-buckle 3, and the spring 17 (or the pawl may be weighted) will permit it to yield without passing a tooth, but so soon as the wear on the brake shoes—or slack in the system—permits an "excessive" movement of the lever (or equivalent moving part) the latch or pawl 8 will ride or be carried past the next tooth 4 of the series and being immediately thrown forward by its springs 17 (or counter balance) will on the return movement of the lever cause the rotation of the nut 3 or turn buckle and thus vary the effective length of the connection (whether the same is a fulcrum rod Fig. 8—or lower connecting rod Fig. 9) sufficiently to compensate for the wear or slack in the system.

Having thus described my invention, what I claim, and desire to secure by Letters Patent, is—

1. In a slack adjuster for brakes, the combination with a moving part of the brake system, of a connection leading thereto and provided with a nut or turn-buckle having external teeth, and an arm or bell crank mounted on the moving part of the brake system and provided with a latch or pawl adapted to engage the teeth of the nut or turn-buckle; substantially as and for the purposes specified.

2. In a slack adjuster for brakes, the combination with a brake lever, of a connecting rod having a turn-buckle provided with external teeth, a bell crank provided with a latch or pawl adapted to engage the teeth of the turn-buckle, and a moving part of the brake system on which said bell crank is mounted; substantially as and for the purposes specified.

3. In a slack adjuster for brakes, the combination with a brake lever, of a connecting rod secured to the lever and provided with a turn-buckle having external teeth, and a bracket or bell crank arm having a latch or pawl which engages the teeth of the turn-buckle, said bracket or bell crank arm having a fulcrum coincident with the point of attachment of the connecting rod and lever; substantially as and for the purposes specified.

4. In a slack adjuster for brakes, the combination with a brake lever and connecting rod provided with a turn-buckle, of a bell crank mounted on the lever and provided with a latch or pawl which engages the turn-buckle; substantially as and for the purposes specified.

5. In a slack adjuster for brakes, the combination with a brake lever, of a connecting rod having an externally toothed turn-buckle, a bell crank mounted on the brake lever and having at one end a spring latch or pawl which engages the teeth of the turn-buckle, and at the other a slot and bolt adjustment device; substantially as and for the purposes specified.

In testimony whereof I affix my signature, in presence of two witnesses, this 6th day of July, 1893.

WALDO H. MARSHALL.

Witnesses:
CHAS. A. BLAKE,
NELSON L. LITTEN.